United States Patent

Endou et al.

[11] Patent Number: 5,963,374
[45] Date of Patent: Oct. 5, 1999

[54] LASER BEAM COLLIMATION APPARATUS AND LASER PROCESSING MACHINE USING SAME

[75] Inventors: Tetsuya Endou; Atsushi Ikemi, both of Nagoya, Japan

[73] Assignee: Mitsubishi Denki Kabushiki Kaisha, Tokyo, Japan

[21] Appl. No.: 08/997,037

[22] Filed: Dec. 23, 1997

[30] Foreign Application Priority Data

Jun. 24, 1997 [JP] Japan ................................. 9-167273

[51] Int. Cl.⁶ .............................. G02B 27/30; G02B 7/02
[52] U.S. Cl. ........................................ 359/641; 359/819
[58] Field of Search ................................ 359/641, 811, 359/819, 820

[56] References Cited

U.S. PATENT DOCUMENTS 5,020,895  6/1991  Giesen et al. ........................... 359/845

FOREIGN PATENT DOCUMENTS 1-166894  6/1989  Japan .

OTHER PUBLICATIONS

JSME Mechanical Engineers' Handbook, A. Fundamentals A4: Strength of Materials, Jun. 25, 1984, pp. 61–62.

Foundation of Engineering; Strength of Materials, Masa-ichirou Seika, Apr. 10, 1978, pp. 136–138.

*Primary Examiner*—Georgia Epps
*Assistant Examiner*—Ricky Mack
*Attorney, Agent, or Firm*—Sughrue, Mion, Zinn, Macpeak & Seas, PLLC

[57] ABSTRACT

A periphery or a section close to a periphery of a collimation mirror is supported by a supporting section of a pressing board from a rear side of a mirror holder without fixing it, and also the collimation mirror is supported by a supporting section of the mirror holder from the front side at a position closer to the center than to a supporting position of the pressing board, so that a pressure is applied to the pressing board from the rear side by a pressurizing means such as an actuator or the like. A peripheral section of the collimation mirror is indirectly cooled by a cooling plate.

14 Claims, 8 Drawing Sheets

LASER BEAM COLLIMATION APPARATUS AND LASER PROCESSING MACHINE USING SAME

FIELD OF THE INVENTION

The present invention relates to a laser beam collimation apparatus (collimator) and a laser processing machine using the same, and more particularly to a collimation apparatus and laser processing machine using the same which can control a laser beam diameter or a converged position of a laser beam by means of controlling a curvature of a reflecting mirror arranged in a light path of the laser beam.

BACKGROUND OF THE INVENTION

Conventionally, there has been a laser processing machine as one of processing devices for cutting a workpiece having a form like a flat plate. Types of the laser processing machine are divided to one based on the fixed light axis system in which a length of a light path from a laser oscillator to a lens for converging a laser beam inside a processing head is kept constant, and the other one based on the optical scanning system which a length of a light path from a laser oscillator to a lens for converging a laser beam inside the processing head varies during processing.

In a laser processing machine based on the optical scanning system, as a length of a light path from the laser oscillator to a lens for converging a laser beam is not kept constant, a beam diameter of a laser beam introducing into the lens for converging light changes, and for this reason a beam diameter at a converged position is not kept constant, which may badly affect a cut surface of a workpiece.

So there has been invented a laser processing machine based on the optical scanning system in which, to keep a beam diameter of an incident laser beam into a converging lens constant during processing, a laser beam oscillated from a laser oscillator is converted to a collimated beam which proceeds without diverging or converging the laser beam against the light axis and is introduced into a converging lens. Japanese Patent Laid-Open Publication No. HEI 1-166894 discloses a laser processing machine having a collimation apparatus which converts a laser beam to a collimated beam.

FIG. 14 shows configuration of the laser processing machine disclosed in Japanese Patent Laid-Open Publication No. HEI 1-166894.

The laser processing machine based on the conventional technology comprises a laser oscillator 1 forming an optical resonator by holding an excitation medium 2 for a laser with a full-reflection mirror 3 as well as a partial reflection mirror 4 and outputting a laser beam; a laser beam collimation apparatus 6B for converting a laser beam 5a (indicated by an alternate dot and dash line in the figure) outputted from the laser oscillator 1 to a collimated beam 5b (indicated by an alternate dot and dash line in the figure); a flat-surface reflection mirror 7 for reflecting the collimated beam 5b converted by the collimation apparatus 6B to change a direction of the light path by 90 degrees; a processing head 8 into which the collimated beam 5b reflected by the flat-surface reflection mirror 7 is introduced; a collimation control unit 15 for controlling a curvature of a collimation mirror 11 in the laser beam collimation apparatus 6B; a beam diameter detecting mechanism 13 for detecting a beam diameter of the collimated beam 5b introduced into a converging lens 9 inside the processing head 8; and an NC (Numerical Control) device 14, a driving mechanism (not shown) which is driven and controlled by the NC device 14.

Provided inside the collimation apparatus 6B are a collimation mirror 11 which can change a curvature R thereof and a flat-surface mirror 12 for introducing the laser beam 5a into the collimation mirror 11 at a small angle for suppressing aberration.

A curvature of the collimation mirror 11 is controlled according to a control signal S16 which is generated by and outputted from the collimation control unit 15.

When laser oscillation occurs inside an optical oscillator comprising the full reflection mirror 3 and partial reflection mirror 4, a portion thereof is oscillated from the partial reflection mirror 4 to outside of the laser oscillator 1 as a laser beam 5a. The laser beam 5a oscillated to outside of this laser oscillator 1 passes through the collimation apparatus 6B, is reflected by the flat-surface reflection mirror 7 to change its direction by 90 degrees, is introduced into the converging lens 9 in the processing head 8, is converged by the converging lens 9, and is irradiated onto the workpiece 10. The laser beam converged and irradiated onto the workpiece 10 is freely moved on the workpiece 10 by a driving mechanism (not shown) controlled by the NC device 14 to process the workpiece 10 into a desired form.

A beam diameter of the collimated beam 5b introduced into the converging lens 9 is detected by the beam diameter detecting mechanism 13. And in the NC device 14, determination is made as to whether the detected beam diameter is a desired one or not, and if it is determined that the detected beam diameter is not a desired one, a control signal S16 is sent from the collimation control unit 15 to the collimation apparatus 6B. With this feature, a curvature R of the collimation mirror 11 is changed so that a beam diameter of the collimated beam 5b introduced into the converging lens 9 will be a desired one.

FIG. 15 shows the laser beam collimation apparatus 6B based on the conventional technology. This collimation apparatus 6B comprises a disk-shaped collimation mirror 11, an actuator 17 comprising a piezoelectric element for pressurizing a central section of a rear surface of the collimation mirror 11 from the rear side, and a mirror holder 18A for accommodating the actuator 17 and collimation mirror 11 and also for fixing a periphery of the collimation mirror 11 as fixing means.

When a drive control signal S16 is sent from the collimation control unit 15 (Refer to FIG. 14) through a signal line 16 to the actuator 17, the actuator 17 presses a rear surface of the collimation mirror 11 with a force corresponding to the drive control signal S16. Because of this operation, the collimation mirror with the periphery fixed to the mirror holder 18A deforms and the curvature changes.

Herein, as shown in FIG. 15, a deflection rate W at a given radius r when a periphery of the disk-shaped collimation mirror 11 is fixed and the central portion is pressed with a load P is expressed by the following expression (1) assuming that a indicates a significant radius of the mirror and D indicates a bending component of the plate.

$$W = \frac{Pa^2}{16\pi D}\left\{1 - \left(1 + 2\ln\frac{a}{r}\right)\frac{r^2}{a^2}\right\} \quad (1)$$

As clearly understood from this expression (1), the deflection rate W at a radius r is not a solution of a two-dimensional function.

It should be noted that, in Japanese Patent Laid-Open Publication No. HEI 1-166894, a curvature of the collimation mirror 11 is changed by changing a pressure of gas (or liquid) applied to a rear surface of the collimation mirror 11.

However, with the laser beam collimation apparatus based on the conventional technology as described above, it is possible to change a curvature of the collimation mirror 11, as a periphery of the collimation mirror 11 is fixed to the mirror holder 18A, a large force is required to change the curvature, or a reflecting surface of the collimation mirror 11 does not become an ideal parabolic surface (Refer to the expression (1) above), and a converging capability of a laser beam becomes lower, which makes it impossible to always process a workpiece 10 under stable conditions.

When a piezoelectric element is used for the actuator 17, as only a force in a pressing direction can be obtained with the piezoelectric element, it is possible only to simply press a rear surface of the collimation mirror 11 and only to change a reflecting surface of the collimation mirror 11 into a convex mirror, in other words it is impossible to change a reflecting surface of the collimation mirror 11 into a concave mirror.

Further in the laser processing machine based on the conventional technology as described above in which change in a beam diameter due to thermal distortion of the collimation mirror 11 caused by incidence of a collimated beam (laser beam) is controlled by detecting a beam diameter of the collimated beam 5b introduced into the converging lens 9 inside the processing head 8 by the beam diameter detecting mechanism 13, the beam diameter detecting mechanism 13 cannot follow a speed of change in a beam diameter due to thermal distortion of the collimation mirror 11, and further it is impossible to always control a beam diameter of the collimated beam 5b introduced into the converging lens 9 at a constant level with high precision. In addition, it is required to provide in the processing head 8 a space for mounting the beam diameter detecting mechanism 13 thereto, and it is extremely difficult to mount the beam diameter detecting mechanism 13.

SUMMARY OF THE INVENTION

It is an object of the present invention to obtain a laser beam collimation apparatus which is adapted to changing a collimation mirror so that it has a high precision and ideal parabolic surface and also to obtain a laser processing machine which is adapted to processing a workpiece always with a constant energy density and high precision.

With the present invention, it is possible to obtain the same deflection rate at a central portion of a collimation mirror with a smaller force as compared to that required in a laser beam collimation apparatus based on the conventional technology and having the configuration in which a periphery thereof is fixed, so that it is possible to deform a collimation mirror into a convex mirror having a reflecting surface with a desired curvature with a smaller force.

With the present invention, it is possible to deform a collimation mirror into a concave mirror having a curved surface with a desired curvature.

With the present invention, it is possible to deform a collimation mirror into a convex mirror having a curved surface with a desired curvature.

With the present invention, it is possible to freely change a collimation mirror with a curvature in a broad range from a concave mirror to a convex mirror.

With the present invention, it is possible to freely change a collimation mirror with a curvature in a broad range from a convex mirror to a concave mirror.

With the present invention, a force working to a collimation mirror functions as a moment around a first or a second supporting means as a fulcrum, and the collimation mirror bends due to the moment.

With the present invention, it is possible to correct deformation of a collimation mirror due to heat absorbed from a laser beam.

With the present invention, a deformation rate of a collimation mirror is detected by a detecting means, so that a curvature of the collimation mirror can be controlled according to a result of detection.

With the present invention, responsibility in control of a curvature of a collimation mirror is sufficiently high enough to follow change in thermal distortion of a collimation mirror as well as change in a length of a light path, so that a curvature of a collimation mirror can immediately be controlled.

With the present invention, operation of a laser oscillator is stopped when defective operation of a laser beam collimation apparatus or malfunction of a collimation control unit occurs.

With the present invention, generation of a defective operation of a laser beam collimation apparatus or a malfunction of a collimation control unit or operation down of a processing line is immediately reported to an operator for the laser processing machine.

With the present invention, to actively change a beam diameter and a converged position of a laser beam converged in a processing head so that it is suited to processing, a collimation mechanism, which can change a curvature of a mirror provided between a laser oscillator and a processing head, is used.

Other objects and features of this invention will become understood from the following description with reference to the accompanying drawings.

DESCRIPTION OF THE PREFERRED EMBODIMENTS

Description is made for Embodiment 1 of the laser beam collimation apparatus according to the present invention.

Figure 3:
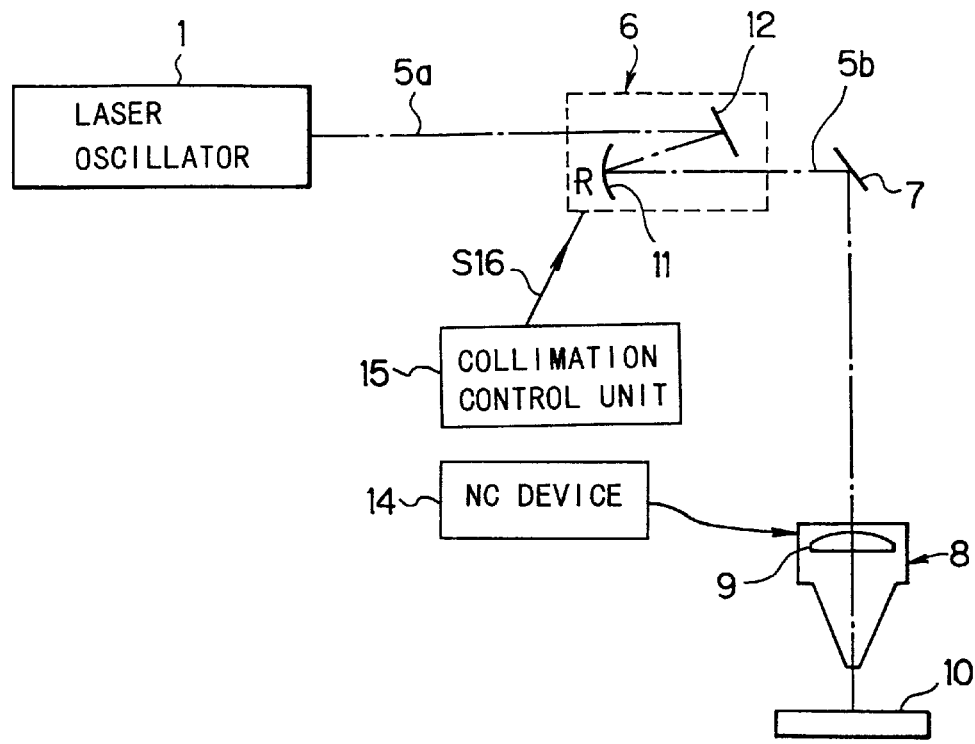
FIG. 3 is a block diagram showing outline of a laser processing machine which is one application example of the laser beam collimation apparatus according to the present invention.

FIG. 3 shows outline of a laser processing machine, which is an application example of the laser beam collimation apparatus according to the present invention. This laser processing machine comprises a laser oscillator 1 for outputting a laser beam; a laser beam collimation apparatus 6 converting a laser beam 5a (indicated by an alternate dot dash line in the figure) outputted from the laser oscillator 1 to a collimated beam 5b (indicated by an alternate dot and dash line in the figure); a flat-surface reflection mirror 7 for reflecting the collimated beam 5b converted by the collimation apparatus 6 to change a direction of the light path by 90 degrees; and a processing head 8 into which the collimated beam 5b reflected by the flat-surface reflection mirror 7 is introduced.

Provided inside the collimation apparatus 6 are a collimation mirror 11 which can change a curvature R thereof and a flat-surface mirror 12 for introducing the laser beam 5a into the collimation mirror 11 at a small angle for suppressing aberration.

And the laser processing machine has the collimation control unit 15 for controlling a curvature of the collimation mirror 11. A curvature of the collimation mirror 11 is changed according to a control signal S16 generated by and outputted from this collimation control unit 15.

The collimated beam 5b introduced into the processing head 8 is converted to a laser beam converged and bundled by the converging lens 9 inside the head and is irradiated onto the workpiece 10. The processing head 8 is moved to a required position on the workpiece 10 by a driving mechanism (not shown in the figure) controlled by a NC device 14.

Figure 1:
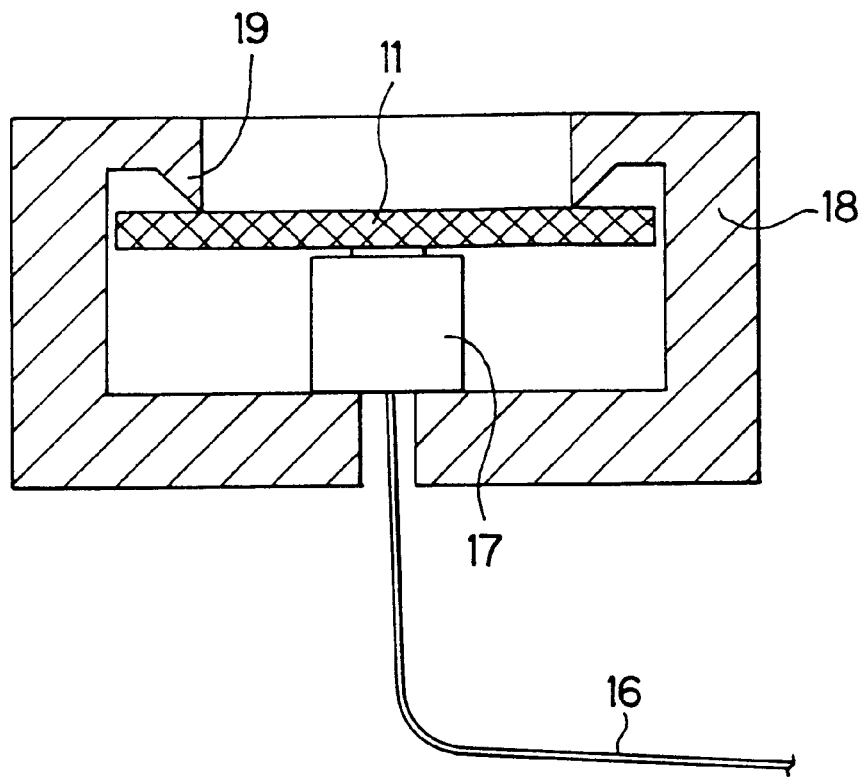
FIG. 1 is a cross-sectional view sowing Embodiment 1 of a collimation mirror section in a laser beam collimation apparatus according to the present invention.

FIG. 1 shows Embodiment 1 of a collimation mirror section in a laser beam collimation apparatus. This laser beam collimation apparatus comprises a disk-shaped collimation mirror 11; a pressurizing means such as an actuator 17 for applying a pressure to a central portion of a rear surface of the collimation mirror 11 from the rear side; a mirror holder 18 which is a casing for accommodating therein the pressurizing means and the collimation mirror 11 and also supports a periphery or a section close to the periphery of the collimation mirror 11 from the front side (it is assumed in the present specification that a side of a reflecting surface of the collimation mirror 11 is the front side); and a collimation mirror section comprising a signal line 16 for a drive control signal (S16) for the actuator 17 or other portions delivered from the collimation control unit 15 (Refer to FIG. 3) to the pressurizing means such as the actuator 17.

The actuator 17 or the like is driven according to a control signal (S16) sent via the signal line 16 from the collimation control unit 15 (Refer to FIG. 3), and a central portion of the collimation mirror 11 is pressed from the rear side thereof. With this operation, the collimation mirror 11 supported by the mirror holder 18 from the front side with the periphery or at a position close to the periphery is bent so that the central portion expands to the front side, thus the curvature is changed.

A supporting section 19 of the mirror holder 18 for supporting the collimation mirror 11 from the front side is formed in a concentric with other components such as the disk-shaped collimation mirror 11 and the actuator 17 or the like, and simply supports the collimation mirror 11.

Namely, a central axis (not shown) of the actuator or the like passes through a central position of the collimation mirror 11, and in a case where a form of a section of the supporting section 19 of the mirror holder 18 contacting the collimation mirror 11 is in circular form, the central axis of the actuator 17 or the like passes through a central position of the circular form. Or, the central axis (not shown) of the actuator 17 or the like passes through a central position of the collimation mirror 11, and in a case where a form of a section of the supporting section 19 of the mirror holder 18 contacting the collimation mirror 11 is not in circular form, the supporting section 19 of the mirror holder 18 is formed and arranged so that the central axis of the actuator 17 or the like passes through a central position of a circuit circumscribing the entire contacting section between the supporting section 19 of the mirror holder 18 and the collimation mirror 11.

And collimation mirror 11 has the central portion supported by the actuator 17 or the like from the rear side of the mirror holder 18, and the periphery or a section close to the periphery is supported by the supporting section 19 of the mirror holder 18 from the front side, so that the collimation mirror 11 is held within the holder 18 without being fixed to the holder 18.

The supporting section 19 of the mirror holder 18 may contact the collimation mirror 11 in a form of circular line contact or may contact it at a plurality of positions in a form of arched line contact or may contact it in a form of point contact at least 3 points.

There is not any specific restriction concerning the actuator 17 or the like, but for instance a piezoelectric element may be used for that. A piezoelectric element is suited to making an operation rate of the actuator 17 or the like minutely change, and can apply a pressure to a rear surface of the collimation mirror 11 with high precision according to the control signal S16.

Figure 2:
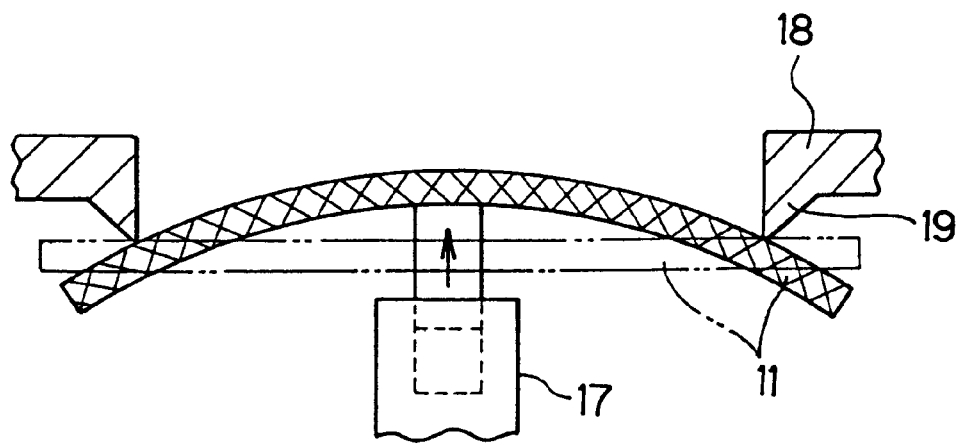
FIG. 2 is a partially enlarged cross-sectional view showing Embodiment 1 of a collimation mirror section in a laser beam collimation apparatus according to the present invention.

Effects of the collimation mirror section having the configuration as shown in FIG. 1 is as described below. Namely, when the actuator 17 or the likes receives a control signal (S16) sent from the collimation control unit 15 (Refer to FIG. 3), the actuator 17 or the like starts driving and presses a central portion of the collimation mirror 11 from the rear side with a force corresponding to the received control signal as indicated by the arrow head shown in FIG. 2. With this operation, the collimation mirror 11 bends so that the central portion expands to the front side as shown in FIG. 2, and changes into a convex mirror having a curvature corresponding to the control signal.

Figure 15:
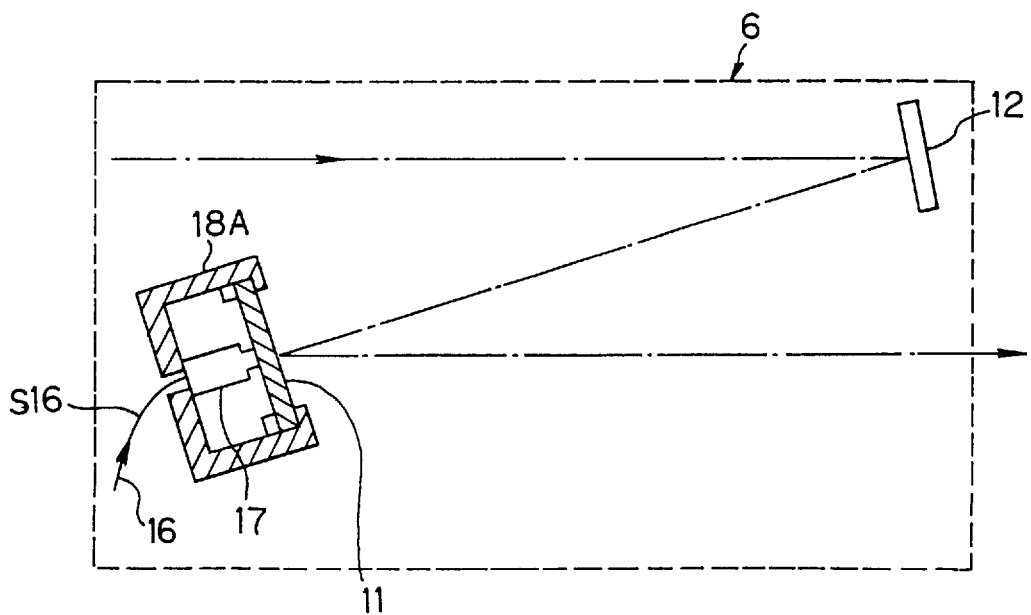
FIG. 15 is a cross-sectional view showing a collimation mirror section in a laser beam collimation apparatus based on the conventional technology.

As described above, as the collimation mirror 11 is not fixed to the mirror holder 18 and is simply supported by the mirror holder 18, the same deflection rate at a central portion of the collimation mirror 11 can be obtained with a smaller force as compared to that required in the conventional type of collimation mirror having the configuration in which a periphery thereof is fixed (Refer to FIG. 15).

Specifically, a force F required to deflect a central portion of the collimation mirror 11 having the configuration as shown in FIG. 1 by the same degree as that in the conventional type of collimation mirror 11 (Refer to FIG. 15) is expressed toward a force F0 required in the conventional technology by the following expression (2). It should be noted that, in the following expression (2), ν indicates a poison ratio (0<ν <0.5).

$$F = \frac{1+\nu}{3+\nu} F0 \quad (2)$$

Next description is made for a process to induce the expression (2) above. In the following description, forces each required to generates the same maximum deflection rate in the central portion in the present invention and the conventional technology are compared to each other. By comparing the forces required to generate the same maximum deflection rate in the central portion in the present invention to that required in the conventional technology, the expression (2) can easily be induced from the known fact concerning bending of a flat plate (Refer to "Foundation of Engineering; Strength of Materials", Masaichirou Seike, p136 to p138, Kyoritsu Shuppan, and "JSME Mechanical Engineers' Handbook; A. Fundamentals, A4: Strength of Materials", Chapter 5, 'Bending of a Flat Plate').

A deflection rate $W_1$ at a given radius r obtainable when a periphery of a disk-shaped mirror is fixed and a load is applied concentratedly to the center is expressed by the following expression (3) assuming that $F_0$ indicates a load, a indicates a significant radius of a mirror, and D indicates a bending component of a plate.

$$W = \frac{F_0 a^2}{16\pi D} \left\{ 1 - \left(1 + 2 ln\frac{a}{r}\right)\frac{r^2}{a^2} \right\} \quad (3)$$

A second term in the above expression (3) is 0 when r is zero (0), so that a maximum deflection rate $W_{1max}$ at a center can be expressed by the following expression (4).

$$W_{1\,max} = \frac{F_0 a^2}{16\pi D} \quad (4)$$

Then, assuming that F indicates a load, ν indicates a poison ratio, and other signs are the same as those in the expression (1) above, a deflection rate at a given radius r obtainable when a mirror having the same form is simply supported and a load is applied concentratedly to the center can be obtained through the following expression (5).

$$W_2 = \frac{Fa^2}{16\pi D} \left\{ \frac{(3+\nu)}{(1+\nu)}\left(1 - \frac{r^2}{a^2}\right) - 2\frac{r^2}{a^2} ln\frac{a}{r} \right\} \quad (5)$$

Also the deflection rate $W_{2max}$ at a central portion at which the maximum deflection rate obtainable through the expression (4) above can be expressed by the expression (6).

$$W_{2\,max} = \frac{Fa^2(3+\nu)}{16\pi D(1+\nu)} \quad (6)$$

Herein, assuming that $W_{1max}$ is equal to $W_{2max}$, the following expression (7) is obtained from the expression (4) as well as from the expression (6), and also the expression (2) above can be induced.

$$F = \frac{1+\nu}{3+\nu} F_o \quad (7)$$

For this reason, it is understood from the expression (2) that, for instance in a case of copper with ν of around 0.3, a force required to deflect a central section of the collimation mirror 11 having the configuration as shown in FIG. 1 by the same degree as that in the collimation mirror having the conventional configuration (Refer to FIG. 15) is only around ⅔ of a force required in the conventional technology.

In the embodiment described above, the collimation mirror 11 is simply supported from the front side by the supporting section 19 of the mirror holder 18 with the periphery or a section close to the periphery without being fixed, and a load can be applied by a pressurizing means such as the actuator 17 or the like to a central portion of a rear side of the collimation mirror 11 from the rear side, so that the same deflection rate at a central portion of the collimation mirror 11 can be obtained with a smaller force as compared to that required in the conventional type of collimation mirror with the periphery fixed (Refer to FIG. 15), and for this reason the collimation mirror 11 can be deformed into a convex mirror having a reflecting surface with a desired curvature.

It is needless to say that the laser beam collimation apparatus according to the present invention can be applied not only to the laser processing machine as described above, but also to other types of apparatus using a collimation apparatus for converting a laser beam to a collimated beam (The same is true also in other embodiments).

Figure 4:
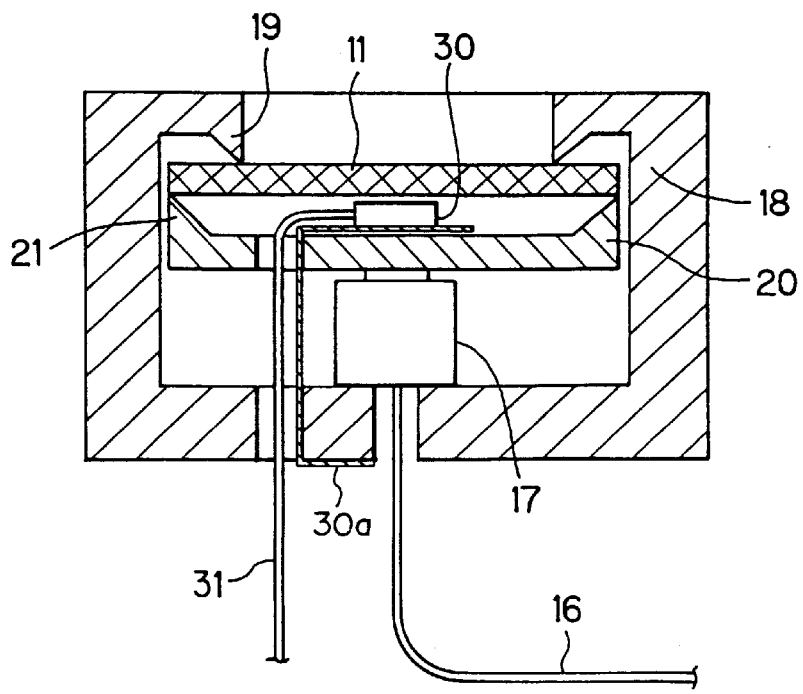
FIG. 4 is a cross-sectional view showing Embodiment 2 of a collimation mirror section in a laser beam collimation apparatus according to the present invention.

FIG. 4 shows Embodiment 2 of the collimation mirror section in the laser beam collimation apparatus according to the present invention.

This laser beam collimation apparatus comprises the collimation mirror 11 comprising a disk-shaped flat plate; a pressing board 20 having a second supporting section 21 which simply supports a periphery or a section close to a periphery of the collimation mirror 11 from the rear side without fixing it; a pressurizing means such as the actuator 17 or the like for applying a pressure to a central portion of the rear surface of the pressing board 20 from the rear side thereof; a mirror holder 18 which is a casing for accommodating therein the pressurizing means, pressing board 20, and collimation mirror 11 and also has a first supporting section 19 for simply holding a section close to a periphery of the collimation mirror 11 from the front side thereof without fixing it; and a collimation mirror section mainly comprising a signal line 16 for a drive control signal (S16)

for the actuator 17 or the like delivered from the collimation control unit 15 (Refer to FIG. 3) to the pressurizing means such as the actuator 17 or the like.

And, when the actuator 17 or the like is driven according to a control signal (S16) sent via the signal line 16 from the collimation control unit 15 (Refer to FIG. 3), the pressing board 20 is pressed from the rear side and moves to the front side, and a peripheral portion of the collimation mirror 11 is pressed by a second supporting section 21 of the pressing board 20 from the rear side. With this operation, the collimation mirror 11 supported by the first supporting section 19 of the mirror holder 18 from the front side with the section close to the periphery is bent at the central portion so that it is concave to the rear side, thus the curvature is changed.

Both the first supporting section 19 of the mirror holder 18 and the second supporting section 21 of the pressing board 20 are formed so that they are concentric with other components, such as the disk-shaped collimation mirror 11 and the actuator 17 or the like, and simply supports the collimation mirror 11.

Namely, the supporting section 19 of the mirror holder 18 and the supporting section 21 of the pressing board 20 are formed and arranged so that the central axis of the actuator 17 or the like passes through a central position of the collimation mirror 11 and also passes through a central position of the supporting section 19 of the mirror holder 18 as well as of the supporting section 21 of the pressing board 20 (in a case where a form of the contact section between the supporting sections 19, 21 and collimation mirror 11 is circular).

If a form of the contact section between the supporting section 19 of the mirror holder 18 or the supporting section 21 of the pressing board 20 and the collimation mirror 11 is not circular, the central axis (not shown) of the actuator 17 or the like passes through a central position of a circle circumscribed to a entire contacting section between the supporting section 19 of the mirror holder 18 and the collimation mirror 11 or a central position of a circle circumscribed to a entire contacting section between the supporting section 21 of the pressing board 20 and the collimation mirror 11.

The collimation mirror 11 has the periphery or a section close to the periphery supported by the supporting section 21 of the pressing board 20 from the rear side of the mirror holder 18 and also has a section closer to the center than the supporting section 21 of the pressing board 20 supported by the supporting section 19 of the mirror holder 18 from the front side, and is held within the mirror holder 18 without being fixed to the holder 18.

The first supporting section 19 of the mirror holder 18 and the second supporting section 21 of the pressing board 20 may contact the collimation mirror 11, for instance, in a form of circular line contact, or may contact the collimation mirror 11 at a plurality of positions in a form of an arched line contact, or may contact it at least 3 points in a form of point contact.

There is not any specific restriction concerning the actuator 17 or the like, but a piezoelectric element may be used for that as in Embodiment 1. By using a piezoelectric element, a rear surface of the pressing board 20 can be pressed with high precision, and also a curvature of the collimation mirror 11 can be controlled with high precision.

In the laser beam collimation apparatus shown in FIG. 4, a gap sensor 30 for measuring a distance to a central portion of a rear surface of the collimation mirror 11 is attached with a support 30*a* . A sensor based on an eddy-current system or a sensor based on the electrostatic capacitance system can be enumerated as a sensor which can be used in this example.

With this gap sensor 30, the distance to a central portion of a rear surface of the collimation mirror 11 is measured, and a result of measurement is fed back to a curvature control mechanism of the collimation mirror 11 to keep a curvature of the collimation mirror 11 always appropriate, which makes it possible to keep constant a beam diameter and a converged position of a laser beam converged by the converging lens 9 with extremely high precision.

Herein the gap sensor 30 has a function as a detecting means for detecting a deflection rate of the collimation mirror 11. It should be noted that the reference numeral 31 in FIG. 4 indicates a signal line for delivering a detection signal from the gap sensor 30.

Effects of the collimation mirror section having the configuration as shown in FIG. 4 are as described below. Namely, when the actuator 17 or the like receives a control signal (S16) sent from the collimation control unit 15 (Refer to FIG. 3), it starts driving, and presses a central portion of the pressing board 20 with a force corresponding to the received control signal, as indicated by the arrow head shown in FIG. 5, from the rear side.

With this operation, the pressing board 20 moves to the front side, and presses a periphery of the collimation mirror from the rear side. A force pressing a periphery of the collimation mirror 11 from the rear side works as a moment around the supporting section 19 of the mirror holder 18 as a fulcrum.

Because of this moment, a central portion of the collimation mirror 11 bends so that it is concave to the rear side, and changes into a concave mirror with a desired curvature corresponding to a control signal.

Herein, assuming that b indicates a radius of the supporting section 21 of the pressing board 20 (in a case where it is assumed that a form of the contact section between the supporting section 21 and the collimation mirror 11 is circular), P indicates a load, a indicates a significant radius of the mirror, ν indicates a poison ratio, and D indicates a bending component of the plate, a deflection rate W at a given radium r from a central position of the collimation mirror 11 is expressed by the following expression (8).

$$W = \frac{Pb^2}{16\pi D}\left\{1 - \left(\frac{(3+v)b^2 - (1-v)r^2}{2(1+v)b^2}\right)\left(1 - \frac{a^2}{b^2}\right) - \frac{a^2 + r^2}{b^2}ln\frac{b}{a}\right)\right\} \quad (8)$$

The above expression (8) can be induced from the known fact concerning bending of a flat plate ("Machine Engineering Handbook; Foundation Class, A4: Material Dynamics", Chapter 5, 'Bending of a Flat Plate').

As clearly understood from the expression (8) above, the deflection rate W at a given radium r from a central position of the collimation mirror 11 is a solution of a two-dimensional function assuming a radium r as a parameter, and also it can be understood that a reflecting surface for a laser beam takes a form of concave with a parabolic surface.

Also it can be understood that a range of change of a curvature of the collimation mirror 11 can be changed by changing a radius b of the supporting section 21 of the pressing board 20 and a pressing force P of the pressing board 20.

In this Embodiment 2, by supporting a periphery or a section close to a periphery of the collimation mirror 11 with the supporting section 21 of the pressing board 20 from the rear side of the collimation mirror 11 without fixing it, and also by supporting the collimation mirror 11 at a position closer to the central position than the supporting section 21 of the pressing board 20 from the front side with the supporting section 19 of the mirror holder 18, a pressure can be applied to the pressing board 20 from its rear side with the pressurizing means such as the actuator 17 or the like, so that the collimation mirror 11 can be changed into a concave mirror having a desired curvature.

Figure 5:
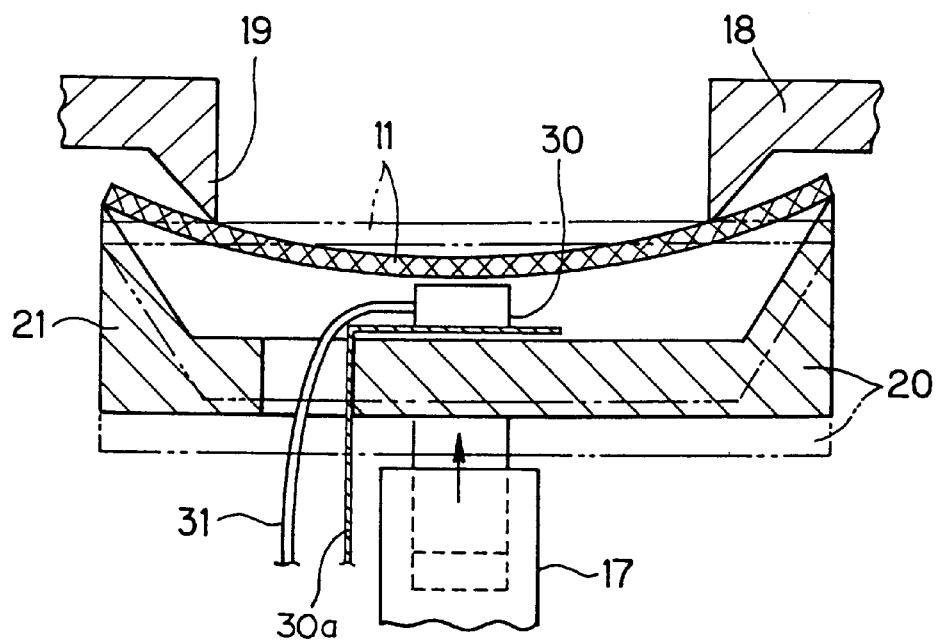
FIG. 5 is a partially enlarged cross-sectional view showing Embodiment 2 of a collimation mirror section in a laser beam collimation apparatus according to the present invention.
Figure 6:
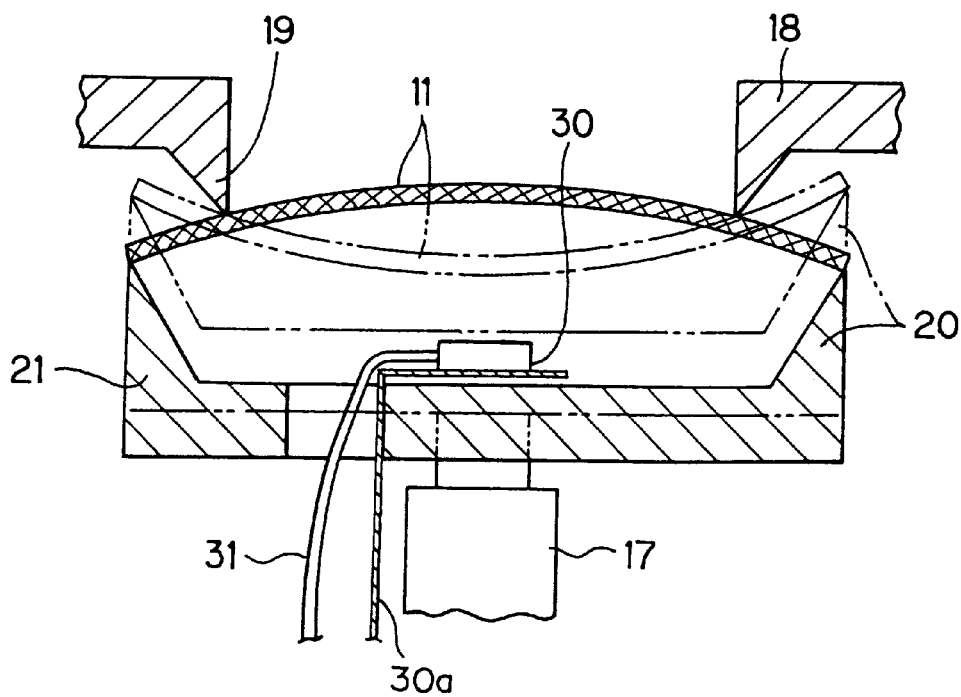
FIG. 6 is a partially enlarged cross-sectional view showing a variant of Embodiment 2 of the collimation mirror section in the laser beam collimation apparatus according to the present invention.

It should be noted that, in Embodiment 2 above, the collimation mirror 11 has a form like a disk-shaped flat plate in the initial state where a load is not applied thereto by the pressurizing means such as the actuator 17 or the like and changes into a concave mirror when the actuator 17 or the like is driven as shown in FIG. 5, but the configuration is not limited to that described above, the collimation mirror may have a form of a convex mirror as indicated by a solid line in FIG. 6 in the initial state and then changes into a concave mirror as indicated by an alternate two-dot and dash line in the figure when the actuator 17 or the like is driven.

With the configuration as described above, it is possible to change the collimation mirror 11 in a broad range of curvature from a convex mirror to a concave mirror, and in a laser processing machine using the collimation mirror 11, it is possible to prevent the converging characteristics or other properties of a laser beam from degrading in a broader range, so that a workpiece can always be processed under constant conditions.

Figure 7:
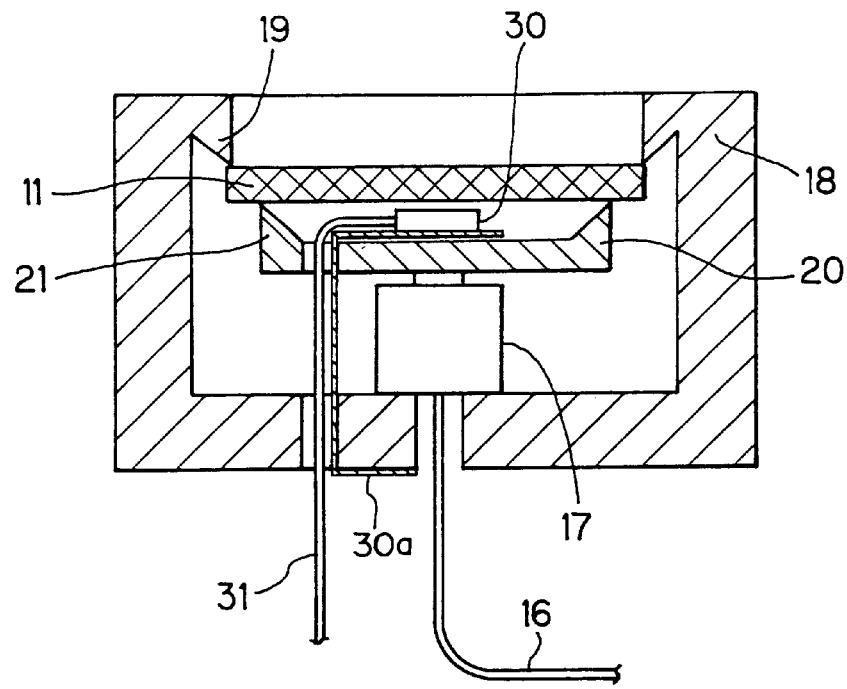
FIG. 7 is a cross-sectional view showing Embodiment 3 of the collimation mirror section of the laser beam collimation apparatus according to the present invention.

FIG. 7 shows Embodiment 3 of the collimation mirror section in a laser beam collimation apparatus.

This laser beam collimation apparatus comprises a collimation mirror 11 comprising a disk-shaped flat plate; a pressing board 20 having a second supporting section 21 simply supporting the collimation mirror 11 at the position closer to the central portion than to a periphery thereof from the rear side without fixing it; a pressurizing means such as the actuator 17 or the like comprising a piezoelectric element applying a pressure to a central portion of the rear surface of the pressing board 20 from the rear side; a mirror holder 18 which is a casing for accommodating therein the pressurizing means, pressing board 20, and collimation mirror 11 and has a first supporting section 19 for simply supporting a periphery or a section close to a periphery of the collimation mirror 11 (a section outer than a position for supporting with the second supporting section 21) from the front side without fixing it; and a collimation mirror section mainly comprising a signal line 16 for a drive control signal (S16) for the actuator 17 or the like delivered from the collimation control unit 15 (Refer to FIG. 3) to the pressurizing means such as the actuator 17 or the like.

When the actuator 17 or the like is driven according to a control signal (S16) sent via the signal line 16 from the collimation control unit 15 (Refer to FIG. 3), the pressing board 20 is pressed from its rear side and moves to the front side, and a section of the collimation mirror 11 closer to the center than the periphery thereof is pressed by the second supporting section 21 of the pressing board 20 from the rear side.

With this operation, a central portion of the collimation mirror 11 with the periphery or a section close to the periphery thereof being supported from the front side by the supporting section 19 of the mirror holder 18 expands to the front side with the curvature is changed.

As in Embodiment 2, both the first supporting section 19 of the mirror holder 18 and the second supporting section 21 of the pressing board 20 are formed so that they are concentric with other components such as the disk-shaped collimation mirror 11 and the actuator 17 or the like, and simply support the collimation mirror 11.

Namely, the supporting section 19 of the mirror holder 18 and the supporting section 21 of the pressing board 20 are formed and arranged so that the central axis (not show) of the actuator 17 or the like passes through the central position of the collimation mirror 11 and also passes through a central position of the supporting section 19 of the mirror holder 18 as well as the supporting section 21 of the pressing board 20 (in a case where a contact section between the supporting sections 19, 21 and the collimation mirror 11 is circular).

If a form of the contact section between the supporting section 19 of the mirror holder 18 or the supporting section 21 of the pressing board 20 and the collimation mirror 11 is not circular, the central axis (not shown) of the actuator 17 or the like passes through a central position of a circle circumscribing to the entire contacting section between the supporting section 19 of the mirror holder 18 and the collimation mirror 11 or a central position of a circle circumscribing to the entire contacting section between the supporting section 21 of the pressing board 20 and the collimation mirror 11.

And a periphery or a section close to a periphery of the collimation mirror 11 is supported by the supporting section 19 of the mirror holder 18 from the front side, and also a section closer to the center than the supporting section 19 of the mirror holder 18 is supported by the supporting section 21 of the pressing board 20 from the rear side of the collimation mirror 11, and is held within the holder 18 without being fixed to the holder 18.

Also as in Embodiment 2, both the first supporting section 19 of the mirror holder 18 and the second supporting section 21 of the pressing board 20 may contact the collimation mirror 11 in a form of circular line contact, or may contact it at a plurality of positions in a form of arched line contact or may contact it, at least 3 points in a form of point contact.

In the laser beam collimation apparatus shown in FIG. 7, as in Embodiment 2, a gap sensor 30 based on the eddy-current system or the electrostatic capacitance system is attached with a support 30a, a distance up to a central portion of the rear surface of the collimation mirror 11 is measured, and a result of the measurement is fed back to a curvature control mechanism of the collimation mirror 11. It should be noted that, in FIG. 7, the reference numeral 31 indicates a signal line for delivering a detection signal from the gap sensor 30.

Operations of the collimation mirror section having the configuration as shown in FIG. 7 are as described below. Namely, when the actuator 17 or the like receives a control signal (S16) sent from the collimation control unit 15 (Refer to FIG. 3), it starts driving, and presses a central portion of the pressing board 20 from its rear side, as indicated by an arrow mark in FIG. 8, with a force corresponding to the received control signal.

With this operation, the pressing board 20 moves to the front side, and presses a section closer to the center than to a periphery of the collimation mirror 11 from the rear side. A periphery of the collimation mirror 11 is supported by the supporting section 19 of the mirror holder 18 from its front side, and for this reason the collimation mirror 11 bends so that the central portion expands to the front side as shown in FIG. 8, and changes to a convex mirror having a curvature corresponding to a control signal.

With Embodiment 3, a periphery or a section close to a periphery of the collimation mirror 11 is supported by the supporting section 19 of the mirror holder 18 from the front side without fixing it, the collimation mirror 11 is supported by the supporting section 21 of the pressing board 20 from its rear side at a position closer to the center than to the supporting section 19 of the mirror holder 18, and also a pressure is applied to the pressing board 20 by a pressurizing means such as the actuator 17 or the like from its rear side, so that the collimation mirror 11 can be deformed into a convex mirror having a desired curvature.

Figure 8:
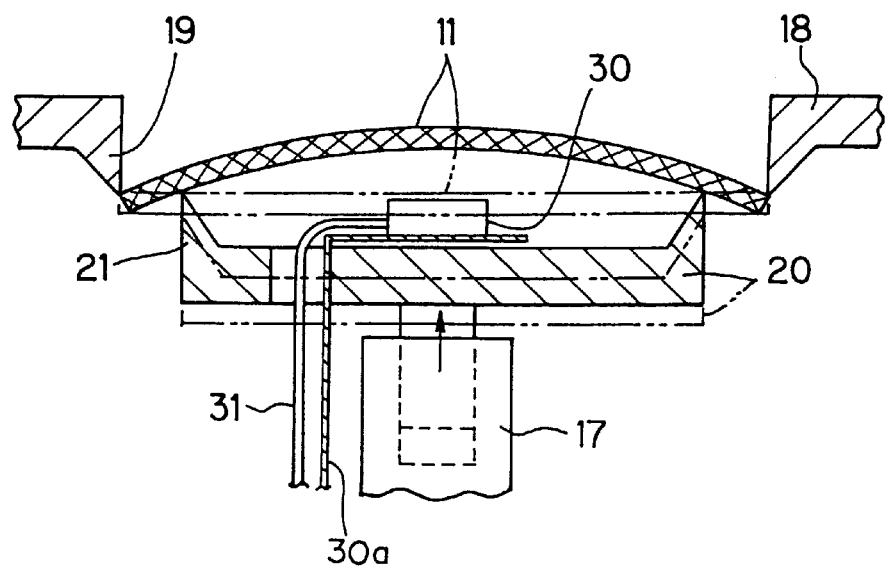
FIG. 8 is a partially enlarged cross-sectional view showing Embodiment 3 of the collimation mirror section of the laser beam collimation apparatus according to the present invention.
Figure 9:
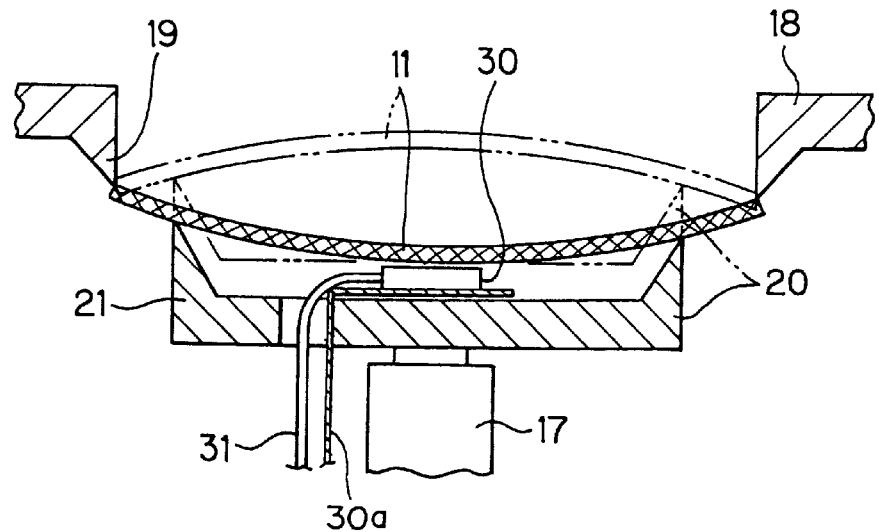
FIG. 9 is a partially enlarged cross-sectional view showing a variant of Embodiment 3 of the collimation mirror section in the laser beam collimation apparatus according to the present invention.

It should be noted that, although, in Embodiment 3, the collimation mirror 11 has a form like a disk-shaped flat plate in the initial state where a load by the pressurizing means such as the actuator 17 or the like is not being applied thereto and deforms to a convex mirror by driving the actuator 17 or the like as shown in FIG. 8, the configuration is not limited to that described above, and the collimation mirror 11 may have a form of a concave mirror in the initial state as indicated by a solid line in FIG. 9 and change to a convex mirror by driving the actuator 17 or the like, as indicated by the alternate long and two short dashes line.

With the configuration as described above, the collimation mirror 11 can be changed in a broad range of curvature from a concave mirror to a convex mirror, so that, in a laser processing machine using the collimation mirror 11 above, the converging characteristics or other properties of a laser beam can be prevented from degrading in a broader range and a workpiece can be processed always under constant conditions.

Figure 10:
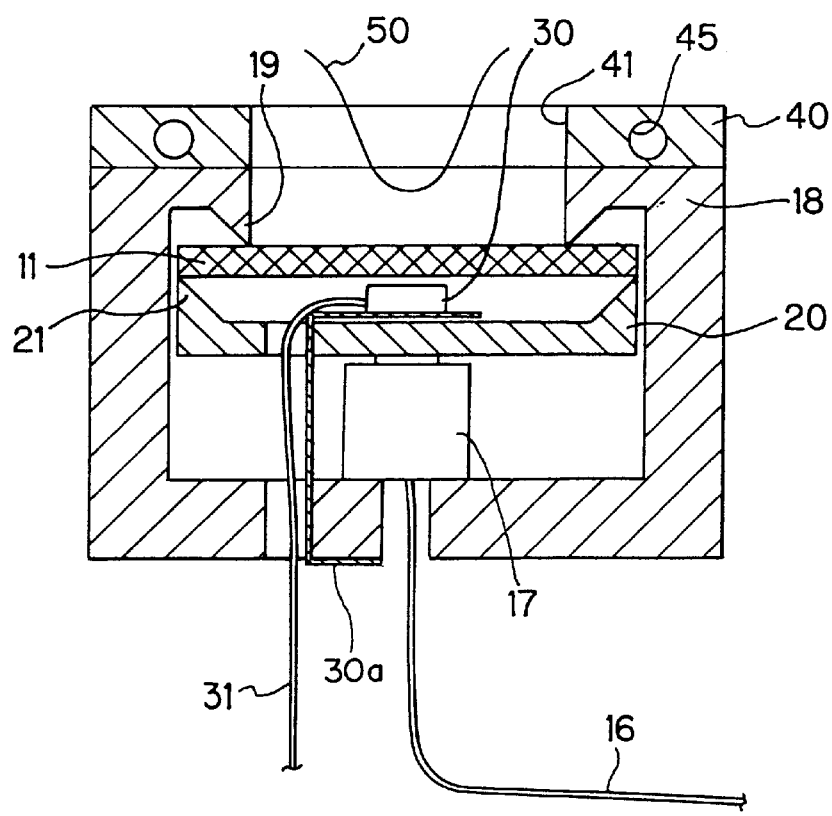
FIG. 10 is a cross-sectional view showing Embodiment 4 of the collimation mirror section in the laser beam collimation apparatus according to the present invention.

FIG. 10 shows Embodiment 4 of the collimation mirror section for the laser beam collimation apparatus according to the present invention.

This laser beam collimation apparatus comprises a collimation mirror section having the same configuration as that in Embodiment 2 as shown in FIG. 4, namely a collimation mirror 11; a pressing board 20 having a second supporting section 21; a pressurizing means such as the actuator 17 or the like, a mirror holder 18 having a first supporting section 19, a collimation mirror section comprising the gap sensor 30 and signal lines 16, 31; and a cooling plate 40 attached to an edge face of the collimation mirror section in the side where a laser beam is reflected.

It should be noted that configuration and operations of the collimation mirror 11, pressing board 20, pressurizing means such as the actuator 17 or the like, mirror holder 18, and collimation mirror section comprising the gap sensor 30 and signal lines 16, 31 are the same as those in Embodiment 2, and that detailed description thereof is omitted herein.

A water path 45 for allowing cooling water to flow therethrough is provided on the cooling plate 40. And, the water path 45 is connected to a cooling water supplying means, and the cooling water is supplied to cool the collimation mirror section.

Also a window section 41 for allowing a laser beam to pass therethrough is provided on the cooling plate 40.

Operations of the collimation mirror section having the configuration as shown in FIG. 10 are as described below. For instance, when the collimation mirror 11 reflects a laser beam having the intensity distribution as indicated by the numeral 50 in FIG. 10, heat absorbed from the laser beam is delivered through the supporting section 19 of the mirror holder 18 to the mirror holder 18 and further to the cooling plate 40.

As described above, it has been known that, when heat with high intensity is introduced to a center of the collimation mirror 11 and the collimation mirror 11 is indirectly cooled from an edge section of an opening of the mirror holder 18, the collimation mirror 11 expands to a form like a parabolic surface because of the conducted heat.

For this reason, even if the collimation mirror deforms due to the heat absorbed from a laser beam, a deformation rate of a curvature of the collimation mirror 11 can be controlled taking into account the deformation rate, which makes it possible to correct deformation of the collimation mirror 11 due to the heat absorbed from a laser beam.

In Embodiment 4, a peripheral portion of the collimation mirror 11 is indirectly cooled by cooling an edge section of an opening of the mirror holder 18 with the cooling plate 40, so that deformation of the collimation mirror 11 due to heat absorbed from a laser beam can be corrected, and for this reason, by using the collimation mirror according to Embodiment 4 in the laser processing machine and also correctly controlling a curvature of the collimation mirror 11, the effect for preventing degradation of the converging characteristics of a laser beam becomes higher, and a workpiece can always be processed under constant conditions.

It should be noted that, although, in Embodiment 4, the cooling plate 40 is attached to the collimation mirror section having the same configuration as that in Embodiment 2 (Refer to FIG. 4), the configuration is not limited to that described above, and that the cooling plate 40 may be attached to the collimation mirror section having the configuration as shown in FIG. 1 or FIG. 4.

Figure 11:
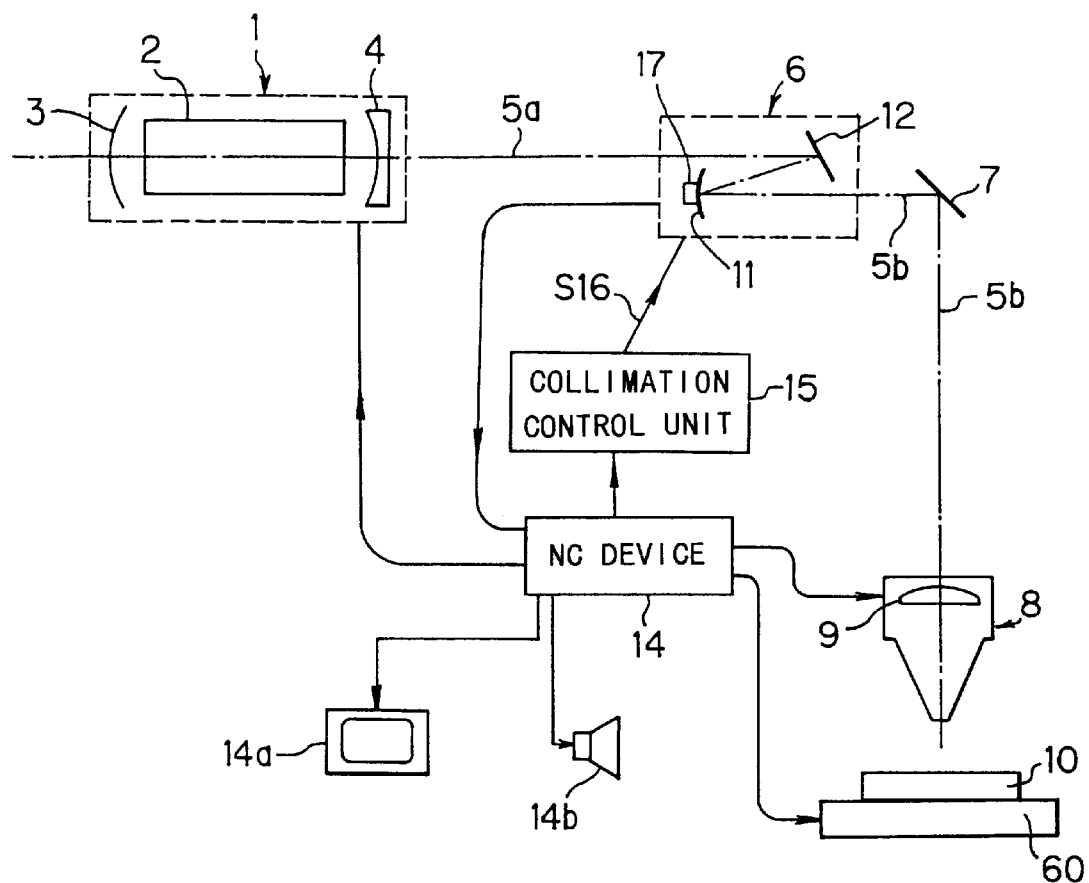
FIG. 11 is a block diagram showing outline of an example of a laser processing machine according to the present invention.

FIG. 11 shows an example of a laser processing machine in which a laser beam collimation apparatus according to the present invention is used.

This laser processing machine comprises a laser oscillator 1 forming an optical resonator by holding an excitation medium 2 for a laser with a full-reflection mirror 3 as well as a partial reflection mirror 4 and outputting a laser beam; a laser beam collimation apparatus 6 with a collimation mirror section having the same configuration as that, for instance, in Embodiments 2 to 4 for converting a laser beam 5*a* (indicated by the alternate dot and dash line in the figure) outputted from the laser oscillator 1 to a collimated beam 5*b* (indicated by the alternate dot and dash line in the figure); a flat-surface reflection mirror 7 for reflecting the collimated beam 5*b* converted by the collimation apparatus 6 to change a direction of the light path by 90 degrees; a processing head 8 into which the collimated beam 5*b* reflected by the flat-surface reflection mirror 7 is introduced; a collimation control unit 15 for controlling a curvature of the collimation mirror 11 in the laser beam collimation apparatus 6; an NC device 14; and a driving mechanism (not shown) which is driven and controlled by the NC device 14. The detailed description for the collimation apparatus 6 is omitted herein.

Effects of the laser processing machine according to this embodiment are as described below. Namely, when it is necessary to change a position of the processing head 8 with a processing program, information concerning a moving position of the processing head 8 is delivered by the NC device 14 to the driving mechanism (not shown) in the processing head 8, and a distance from the laser oscillator 1 to the processing head 8 is computed in the NC device 14.

Although the details are described hereinafter, a required change rate of a curvature R of the collimation mirror 11 is computed by the NC device 14 according to the computed distance between the laser oscillator 1 and the processing head 8 so that the characteristics of a laser beam introduced into a converging lens is kept constant, and a control signal S16 corresponding to the computed change rate is sent from the collimation control unit 15 to the laser beam collimation apparatus 6. When the control signal S16 is delivered to the actuator 17, the actuator 17 or the like in the laser beam collimation apparatus 6 starts its operation and a curvature of the collimation mirror 11 is changed.

The gap sensor 30 in the laser beam collimation apparatus 6 (not shown in FIG. 11. Refer to FIGS. 4, 7 and 10) described above detects a gap to a central portion of a rear surface of the collimation mirror 11. The actual gap measured as described above is fed back to the NC device 14.

On the other hand, in the NC device 14, a curvature making it possible to keep constant a beam diameter and a converged position of a laser beam is computed, and a computed value for a gap to a central portion of the rear surface of the collimation mirror 11 is computed according to the obtained curvature.

And, in the NC device 14, the measured value for the gap obtained by the gap sensor 30 is compared to the computed value for the gap computed by the NC device 14. As a result of comparison, if it is determined that the actual curvature R of the collimation mirror 11 is not appropriate (namely, that the actual measured value for the gap is outside the allowable range for the computed value), a control signal S16 is generated by and sent from the collimation control unit 15 to the actuator 17 or the like so that the curvature is changed to a desired one.

Figure 12:
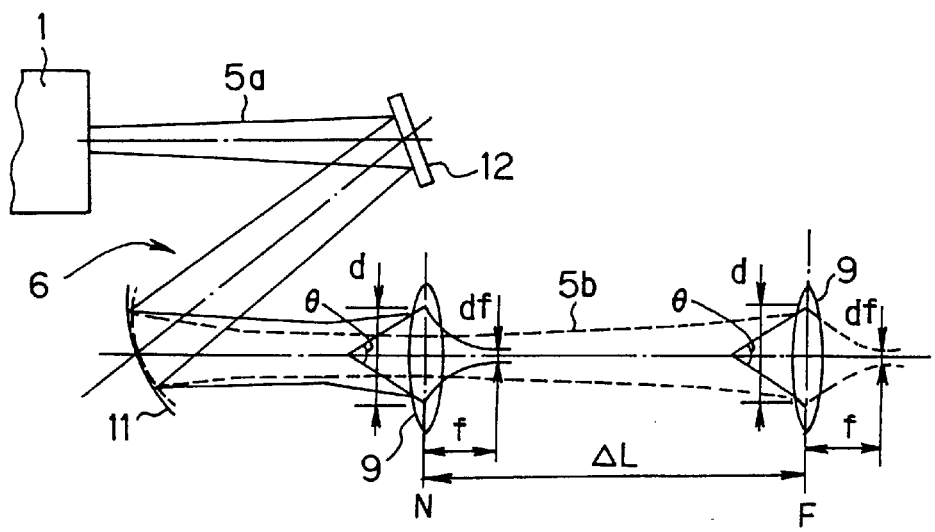
FIG. 12 is a general block diagram showing a light path in the laser processing machine according to the present invention.

With this operation, in the laser processing machine as shown in FIG. 11, the curvature R of the collimation mirror 11 can be changed to an appropriate one corresponding to a distance between the laser oscillator 1 and the processing head 8. As shown in FIG. 12, a beam diameter d and a beam divergence angle θ at an incident position on the lens of a laser beam introduced into the converging lens 9 can be kept constant in a movable range of the processing head 8 between a point N (The light path to the point N is indicated by a solid line) at which a light path between the laser oscillator 1 and the converging lens 9 in the processing head 8 is shortest and a point F (The light path to the point F is indicated by a broken line) by ΔL off from the point N.

A beam diameter d of a laser beam introduced into the converging lens 9 is reverse-proportional to a converged beam diameter df at the converged position, and also the beam divergent angle θ at the incident position of the lens is a parameter for determining a converged position, but in the laser processing machine shown in FIG. 11, as described above, even if a distance from the laser oscillator 1 changes, the beam diameter d of a laser beam introduced into the converging lens 9 and a beam divergent angle θ at the incident position of the beam on the lens can be kept constant, so that a converged position f and a converged beam diameter df at the converged position f each required for determining processing conditions can be kept constant.

Also the laser processing machine shown in FIG. 11 comprises an interlocking mechanism which can stop laser oscillation in the laser oscillator 1 according to the curvature R of the collimation mirror 11, in addition to the configurations and effects described above.

When an actually measured value for a gap obtained by the gap sensor 30 is compared in the NC device 14 to a computed value for the gap computed by the NC device 14 and the actually measure value for the gap exceeds a prespecified value, it is detected by the NC device 14 and an oscillation stop signal is sent to the laser oscillator 1 to stop laser oscillation in the laser oscillator 1. With this operation, processing fault or damages such as burning of materials around the light path due to excessive divergence of a laser beam can be prevented by detecting operation fault of the actuator 17 or the like in the laser beam collimation apparatus 6 or a malfunction of the collimation control unit 15.

In the laser processing machine shown in FIG. 11, when the interlocking mechanism is activated by the NC device 14, processing is immediately interrupted according to control by the NC device 14, and the fact that any abnormality has been generated in a laser beam due to an inappropriate curvature of the collimation mirror 11 is displayed in a display section 14a of the NC device 14, or an alarm such as an alarming sound is generated from a speaker 14b, or a lamp is lit or intermittently lit and turned off to alert an operator of the laser processing machine that abnormality has been generated and operation of the production line has been stopped.

With this operation, an operator of the laser processing machine can immediately know generation of abnormality, and can take necessary measures against the error. The display section 14a, speaker 14b, and lamp have a function as that of an alerting means respectively.

In this Embodiment 5, an actual gap to a central portion of a rear surface of the collimation mirror 11 is detected by the gap sensor 30 in the laser beam collimation apparatus 6, also a theoretical gap to a central portion of the rear surface of the collimation mirror 11 is computed by the NC device 14, the gap values are compared by the NC device 14 to the computed value, and a curvature R of the collimation mirror 11 is controlled by controlling the actuator 17 or the like in the laser beam collimation apparatus 6 according to a result of comparison, so that the responsibility of the gap sensor 30 as well as of the actuator 17 or the like can fully follow a changing speed of thermal distortion of the collimation mirror 11 and a changing speed of a light path, and for this reason, a curvature of the collimation mirror 11 can immediately be controlled, and a beam diameter of a laser beam converged by the converging lens 9 and a converged position can be kept constant with extremely high precision.

It should be noted that, although an actual gap to a central portion of a rear surface of the collimation mirror 11 is detected by the gap sensor 30 in the laser beam collimation apparatus 6 in Embodiment 5 described above, the configuration is not ways limited to that described above, and that a curvature of the collimation mirror 11 may be controlled with higher precision, for instance, by arranging a plurality of gap sensors along a circumference with a radius or along circumferences with a plurality of radiuses of the collimation mirror 11 and detecting a gap to the each point corresponding to the circumference at the rear surface of the collimation mirror 11 by each gap sensor to obtain further precise information concerning offset of a reflecting surface of the collimation mirror from an ideal parabolic surface according to a plurality of detected values obtained as described above.

Figure 13:
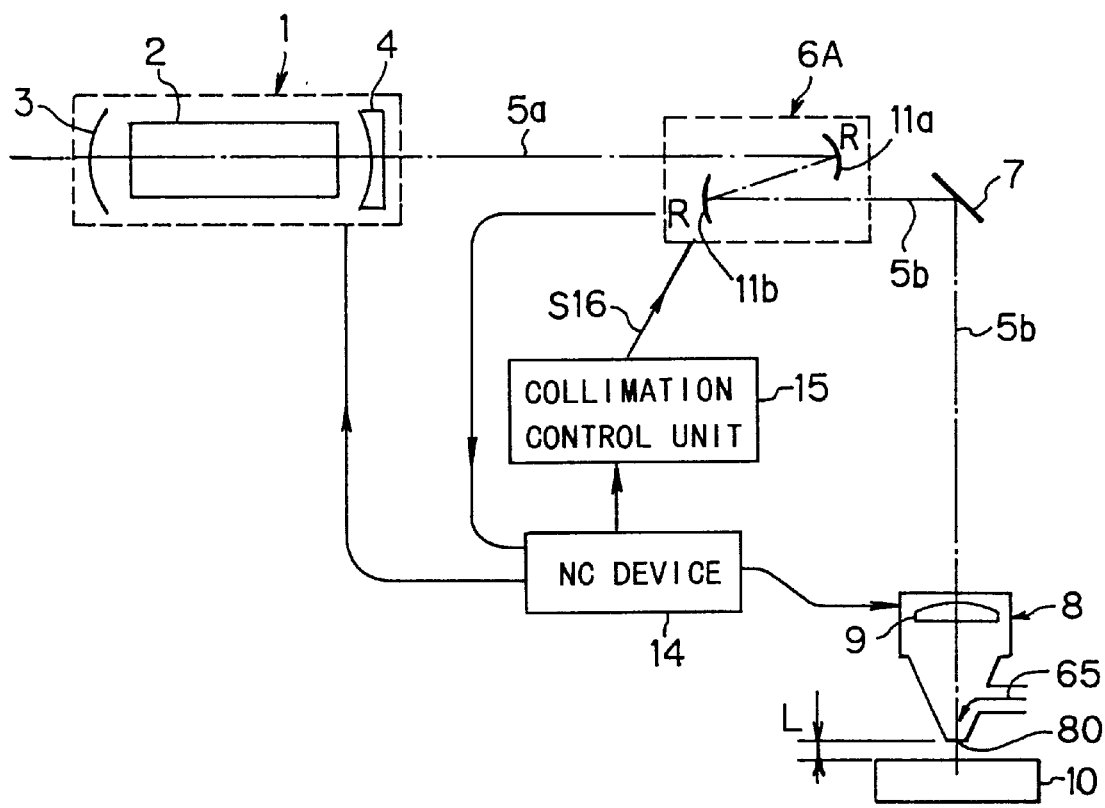
FIG. 13 is a block diagram showing outline of another example of the laser processing machine according to the present invention.
Figure 14:
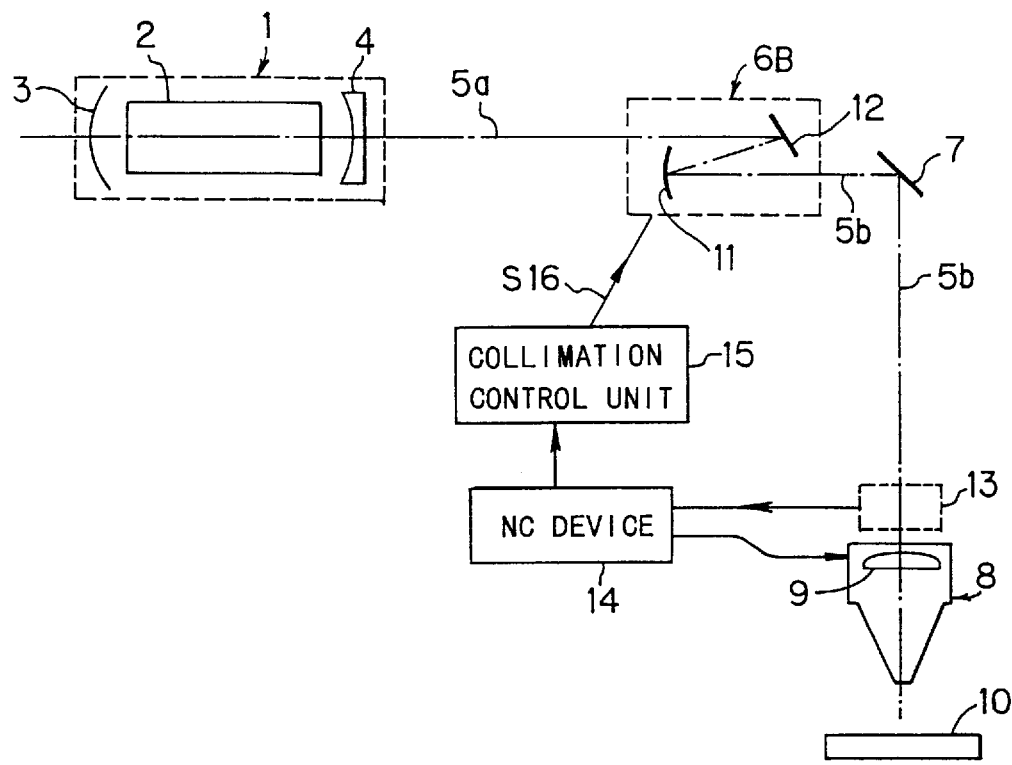
FIG. 14 is a block diagram showing outline of a conventional type of laser processing machine.

FIG. 13 shows another example of the laser processing machine using the laser beam collimation apparatus according to the present invention.

This laser processing machine comprises a laser oscillator 1 forming an optical resonator by holding an excitation medium 2 for a laser with a full-reflection mirror 3 as well as a partial reflection mirror 4 and outputting a laser beam; a laser beam collimation apparatus 6A for converting a laser beam 5a (indicated by an alternate dot and dash line in the figure) outputted from the laser oscillator 1 to a collimated beam 5b (indicated by an alternate dot and dash line in the figure); a flat-surface reflection mirror 7 for reflecting the collimated beam 5b converted by the collimation apparatus 6A to change the direction of the light path by 90 degrees; a processing head 8 into which the collimated beam 5b reflected by the flat-surface reflecting mirror 7 is introduced;

a collimation control unit 15 for controlling a curvature of each of the collimation mirrors 11a, 11b in the laser beam collimation apparatus 6A; an NC device 14; and a driving mechanism (not shown) which is driven and controlled by the NC device 14.

And in this laser processing machine, by controlling the curvature of collimation mirrors 11a and 11b, a converged position of a beam converged by the converging lens 9 and a beam diameter of the beam at the converged position can actively be changed according to the processing conditions.

The collimation apparatus 6A has two units of collimation mirror section each having the same configuration as that in any of Embodiments 2 to 4. Either one of the collimation mirror sections has a collimation mirror 11a into which the laser beam 5a oscillated from the laser oscillator 1 is introduced and which can reflect the incident beam changing the beam diameter to a desired one.

A beam diameter of a reflected beam can be determined according to a curvature of the collimation mirror 11a. The curvature of the collimation mirror 11a is adjusted according to a control signal S16 sent from the collimation control unit 15.

The other collimation mirror section has a collimation mirror 11b for converting a reflected beam reflected by the collimation mirror 11a to a collimated beam 5b. Also a curvature of this collimation mirror 11b is adjusted according to a control signal S16 sent from the collimation control unit 15.

Also provided at a tip of the processing head 8 is a nozzle 80 for flowing a processing gas 65 for protecting the converging lens 9 from the dust and for cooling a workpiece 10 in parallel to a laser beam (collimated beam 5b). And to suppress divergence of the processing gas 65 to sections other than a processing surface of the workpiece 10, generally, a distance L between a nozzle 80 during processing and a workpiece 10 is maintained in a range from 1 mm to 2 mm.

Effects of the laser processing machine according to this embodiment are as described below. Namely, a converged position of a beam converged by the converging lens 9 and a beam diameter at the converged position are adjusted according to the processing conditions by controlling a curvature of the collimation mirrors 11a, 11b, so that the converged position can be specified to the optimum position according to quality and thickness of a workpiece and also a beam diameter at the converged position can be adjusted to the optimum one.

For instance, generally, when a workpiece 10 is processed for cutting by using a carbon dioxide laser, an excellent cut face can be obtained by aligning the converged position onto a surface of the workpiece 10, but it is known that, in some materials such as aluminum or stainless steel, an excellent cut face can be obtained by aligning a converged position of a beam onto a rear surface of the workpiece 10.

For this reason, when an aluminum or stainless steel is cut by aligning a converged position of a laser beam onto a surface of a workpiece 10, it is required only to align a converged position onto a rear surface of the workpiece 10 without changing the beam diameter at the converged position.

Also, when a plurality of plates of the same material is to be cut, for instance, if thickness of one plate is 1 mm and that of the other plate is 19 mm, an optimum beam diameter at each converged position may vary. In the case as described above, it is required only to adjust a beam diameter at the converged position by optimally controlling each curvature of the two sheets of collimation mirrors 11a, 11b.

In Embodiment 6, the collimation apparatus 6A has two sheets of collimation mirrors 11a, 11b, a curvature of each of which can be changed, so that it is possible to change only a converged position without changing a beam diameter at the converged position or to changes a beam diameter at the converged position to an optimum one according to quality or thickness of the workpiece 10 by optimally controlling a curvature of each of the collimation mirrors 11a, 11b.

It should be noted that, in the conventional technology, as a distance L between a nozzle and a workpiece is in a range from 1 to 2 mm during processing, when the processing head is lowered with a movable shaft to align a converged position of a beam onto a rear surface of the workpiece, interference between the workpiece and the nozzle occurs, and for this reason, it has been impossible to align the converged position to a rear surface of the workpiece.

The invention made by the present inventor was described above with reference to embodiments of the present invention, but it is needless to say that the present invention is not limited to the embodiments described above, and that various modifications may be made within the gist of the present invention.

For instance, the pressurizing means for applying a pressure to the collimation mirror 11 is not limited to the actuator 17 comprising a piezoelectric element or the like, and an actuator using other type of element or a device other than an actuator may be used for this purpose on the condition that it can press the collimation mirror 11 to change a curvature of the collimation mirror 11.

With the present invention, the same deflection rate can be obtained at a central portion of the collimation mirror with a force smaller as compared to that required in the conventional type of laser beam collimation apparatus having the configuration in which a periphery thereof is fixed, so that a collimation mirror can be changed to a convex mirror having a reflecting surface with a desired curvature with a smaller force, and for this reason, the converging characteristics or other properties of a laser beam can be prevented from degrading by using this laser beam collimation apparatus in a laser processing machine to appropriately control a curvature of the collimation mirror, and a workpiece can be processed always under constant conditions.

With another aspect of the present invention, a collimation mirror can be deformed to a concave mirror having a desired curvature, and for this reason the converging characteristics or other properties of a laser beam can be prevented from degrading by using this laser beam collimation apparatus in a laser processing machine to appropriately control a curvature of the collimation mirror, and a workpiece can be processed always under constant conditions.

With another aspect of the present invention, a collimation mirror can be deformed to a convex mirror having a desired curvature, and for this reason the converging characteristics or other properties of a laser beam can be prevented from degrading by using this laser beam collimation apparatus in a laser processing machine to appropriately control a curvature of the collimation mirror, and a workpiece can be processed always under constant conditions.

With another aspect of the present invention, a collimation mirror can be changed freely with a curvature in a broad range from a concave mirror to a convex mirror, so that, in a laser processing machine using the laser beam collimation apparatus, the converging characteristics or other properties of a laser beam can be prevented from degrading in a broader range and a workpiece can always be processed under constant conditions.

With another aspect of the present invention, a collimation mirror can be changed freely with a curvature in a broad range from a convex mirror to a concave mirror, so that, in a laser processing machine using the laser beam collimation apparatus, the converging characteristics or other properties of a laser beam can be prevented from degrading in a broader range and a workpiece can always be processed under constant conditions.

With another aspect of the present invention, a pressure applied to a collimation mirror works as a moment around a first or a second supporting means as a fulcrum, and the collimation mirror bends according to the moment, so that a reflecting surface having a desired form can be obtained.

With another feature of the present invention, deformation of a collimation mirror due to heat absorbed from a laser beam can be corrected, so that the effect for preventing degradation of the converging characteristics or other properties of a laser beam becomes higher and a workpiece can always be processed under constant conditions by using the laser beam collimation apparatus in a laser processing machine to appropriately control a curvature of the collimation mirror.

With another aspect of the present invention, a deformation rate of a collimation mirror is detected by a detecting means, and a curvature of the collimation mirror can be controlled according to a result of detection, so that a curvature of the collimation mirror can always be maintained appropriately and a beam diameter of a converged laser beam and a converged position can always be kept constant with high precision.

With another aspect of the present invention, the responsibility of curvature control for a collimation mirror can fully follow a changing speed of distortion of the collimation mirror due to heat and a changing speed of a length of a light path, so that a curvature of the collimation mirror can immediately be controlled and also a beam diameter of a laser beam converged by a converging lens and a converged position can be kept constant with extremely high precision.

With another aspect of the present invention, driving of a laser oscillator is stopped when operation fault of a laser beam collimation apparatus or a malfunction of a collimation control unit occurs, so that material around the light path can be prevented from burning due to processing fault or excessive divergence of the laser beam.

With another aspect of the present invention, generation of operation fault of a laser beam collimation apparatus or a malfunction of a collimation control unit and operation down of the processing line is immediately reported to an operator of a laser processing machine, so that the operator of the laser processing machine can immediately know generation of abnormality and take necessary measures against the error.

With another aspect of the present invention, a converged position of a laser beam and a beam diameter at a converged position can be adjusted by using a collimation mechanism which can change a curvature of a mirror provided between a laser oscillator and a processing head, so that it is possible to change only the converged position without changing a beam diameter at the converged position or to adjust the beam diameter at the converged position to an optimum value according to quality or thickness of a workpiece.

This application is based on Japanese patent application No. HEI 9-167273 filed in the Japanese Patent Office on Jun. 24, 1997, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A laser beam collimation apparatus into which a laser beam is introduced and which can convert the incident laser beam to a collimated beam, said laser beam collimation apparatus comprising:

a collimation mirror which reflects said incident laser beam and outputs the reflected beam and can deform a reflecting surface to change a curvature thereof;

a first supporting unit for supporting said collimation mirror from the reflecting surface side thereof contacting a periphery of the reflecting surface of said collimation mirror or a position closer to the center than a section near the periphery of the reflecting surface of said collimation mirror without fixing a periphery or a section near the periphery of said collimation mirror;

a second supporting unit for supporting said collimation mirror from a rear side of the reflecting surface contacting a periphery of a rear side of the reflecting surface of said collimation mirror or a position closer to the periphery thereof than a position for supporting with said first supporting unit without fixing a periphery or a section near the periphery of said collimation mirror; and a pressurizing unit which can apply a pressure to said second supporting unit to press it to the side of said collimation mirror.

2. A laser beam collimation apparatus according to claim 1; wherein a reflecting surface of said collimation mirror takes a form of concave surface in the state where a pressure is not applied by said pressurizing means thereto.

3. A laser beam apparatus according to claim 1; wherein a reflecting surface of said collimation mirror takes a form of a convex surface in the state where a pressure is not applied by said pressurizing means thereto.

4. A laser beam collimation apparatus according to claim 1; wherein said first supporting means and said second supporting means coaxially contact said collimation mirror.

5. A laser beams collimation apparatus according to claim 1 further comprising a cooling means for indirectly cooling a section close to a periphery of said collimation mirror.

6. A laser processing machine comprising:

a laser oscillator for outputting a laser beam;

the laser beam collimation apparatus according to claim 5 into which a laser beam outputted from said laser oscillator is introduced and which converts said laser beam to a collimated beam; and a collimation control unit of said laser beam collimation apparatus for controlling a pressurizing means inside the laser beam collimation apparatus according to a result of detection of a deformation rate of said collimation mirror by a detecting means for detecting a deformation rate of the collimation mirror inside the laser beam collimation apparatus.

7. A laser processing machine according to claim 6 further comprising an interlocking mechanism which stops driving of said laser oscillator according to a result of detection of a deformation rate of the collimation mirror by said detecting means.

8. A laser processing machine according to claim 7 further comprising a reporting means for reporting that driving of said laser oscillator has been stopped by said interlocking mechanism.

9. A laser beam collimation apparatus according to claim 1 further comprising a detecting means for detecting a deformation rate of said collimation mirror.

10. A laser beam collimation apparatus into which a laser beam is introduced and which can convert the incident laser beam to a collimated beam, said laser beam collimation apparatus comprising:

a collimation mirror which reflects said incident laser beam and outputs the reflected beam and can deform a reflecting surface to change a curvature thereof;

a first supporting unit for supporting said collimation mirror from the side of reflecting surface thereof contacting a periphery or a section close to a periphery of the reflecting surface of said collimation mirror without fixing a periphery or a section close to the periphery of said collimation mirror;

a second supporting unit for supporting said collimation mirror from a rear side of the reflecting surface thereof contacting a position closer to the center of a rear side of the reflecting surface of said collimation mirror than a position for supporting with said first supporting unit without fixing a periphery or a section near the periphery of said collimation mirror; and a pressurizing unit which can apply a pressure to said second supporting unit to press it to the side of said collimation mirror.

11. A laser beam collimation apparatus according to claim 10; wherein a reflecting surface of said collimation mirror takes a form of a concave surface in the state where a pressure is not applied by said pressurizing means thereto.

12. A laser beam collimation apparatus according to claim 10; wherein said first supporting means and said second supporting means coaxially contact said collimation mirror.

13. A laser beams collimation apparatus according to claim 10 further comprising a cooling means for indirectly cooling a section close to a periphery of said collimation mirror.

14. A laser beam collimation apparatus according to claim 10 further comprising a detecting means for detecting a deformation rate of said collimation mirror.

* * * * *